United States Patent
Baresich et al.

(10) Patent No.: US 7,175,416 B2
(45) Date of Patent: Feb. 13, 2007

(54) INJECTION MOLDING NOZZLE STRUCTURED FOR COOLING AT EXTREME TIP

(75) Inventors: Frank J. Baresich, Centerville, GA (US); Robert F. Thompson, Kennebunk, ME (US)

(73) Assignee: Thermal Wave Molding Corp., Aventura, FL (US)

( * ) Notice: Subject to any disclaimer, the term of this patent is extended or adjusted under 35 U.S.C. 154(b) by 374 days.

(21) Appl. No.: 10/814,000

(22) Filed: Mar. 31, 2004

(65) Prior Publication Data

US 2004/0191354 A1 Sep. 30, 2004

Related U.S. Application Data

(60) Provisional application No. 60/459,123, filed on Mar. 31, 2003.

(51) Int. Cl.
*B29C 45/20* (2006.01)
(52) U.S. Cl. .................... 425/549; 264/328.15
(58) Field of Classification Search ........... 425/549; 264/328.15
See application file for complete search history.

(56) References Cited

U.S. PATENT DOCUMENTS

| 4,981,431 A | 1/1991 | Schmidt |
| 5,299,928 A | 4/1994 | Gellert |
| 5,569,475 A | 10/1996 | Adas et al. |
| 5,879,727 A | 3/1999 | Puri |
| 5,885,628 A | 3/1999 | Swenson et al. |
| 7,025,585 B2 * | 4/2006 | Gellert ............... 425/549 |

* cited by examiner

*Primary Examiner*—Tim Heitbrink
(74) *Attorney, Agent, or Firm*—Duane Morris LLP

(57) ABSTRACT

A nozzle for injection molding is made of at thermally conductive metal material but is thermally conductively blocked or interrupted. An abrupt reduction in wall thickness and/or a gap in the continuity of thermally conductive material occur along the nozzle material passageway. This provides a localized restriction to thermal conduction, causing a reduction in heat flow from the mold to the material supply while cooling the melt material near the end of the nozzle. This material, which is relatively cooled to near the mold temperature, becomes the last injected material when filling of the mold is completed, occupying the area of the sprue. As a result, the sprue is relatively cool, thus reducing stringing and shortening mold cycle time.

14 Claims, 4 Drawing Sheets

INJECTION MOLDING NOZZLE STRUCTURED FOR COOLING AT EXTREME TIP

CROSS REFERENCE TO RELATED APPLICATION

This application claims the priority of U.S. Provisional Patent Application Ser. No. 60/459,123, filed Mar. 31, 2003.

BACKGROUND OF THE INVENTION

The invention relates to the field of injection molding apparatus and provides an injection molding nozzle structure defining a flow path for the heated material wherein an extreme end of the nozzle is configured to break the continuity of a thermally conductive path between the proximal portion of the nozzle, which proximal portion is closer to the heated material supply, and the distal portion of the nozzle, which distal portion bears against the heat dissipating injection mold.

Injection molding is a well known process that involves introducing a heated molten material such as molten plastic resin, into a mold cavity where the material is to cool and set in the shape of an article, the shape being determined by the mold cavity. The set or hardened part is removed from the cavity and the operation is repeated, normally cycling the mold repeatedly to make one part after another.

Among the minimum requirements for injection molding are a source of material that is heated to a temperature higher than the melting point of the material, and means defining a mold cavity that is normally cooler than such melting point and can be opened or accessed so as to remove the cooled article once the article has set in the shape of the cavity.

There are any number of variations as to the articles that are molded, the materials to be used for molding, the structure of the molding apparatus, temperature cycles, flow configurations and other matters. However, the molding material needs to be supplied to the mold in a heated molten state at which the material is liquid or at least viscously deformable, and cooled in the mold to set into the shape of the mold cavity.

Inherently, at least part of the material supply feeding the mold cavity needs to be at a relatively higher temperature, above a softening temperature of the material. Also, the mold cavity needs to be brought at some point in the process to a relatively lower temperature, below such softening point for setting the material.

It is possible to cycle through a range of temperatures. The mold cavity can have a low pre-injection temperature, the cavity being heated by injection of very hot molten material, and carrying away heat energy as the cavity temperature drops to below the material softening temperature. It is inefficient to couple a material supply that needs to be hot, with a mold cavity that needs to be cool. Thermal coupling could cause heat energy associated with melting the material to counteract the need to cool the cavity, and vice versa.

It would be possible to provide thermal insulation as a means to block the passage of thermal energy between a material supply and mold cavity, in any way other than as carried along by the specific heating of the material that moves from one to the other. A thermally insulating valve structure may be applicable. Another technique is to couple the material supply to the mold cavity only intermittently, using a nozzle. The nozzle is in thermal engagement with the material supply, and is hot. The nozzle engages with an injection port leading into the mold cavity during the process of injecting material. After injecting the material, the nozzle is detached, thereby preventing further movement of heat energy between the supply and the mold.

An injection molding coupling could conceivably be male or female on either side to engage with a fitting of the opposite gender on the other side. The coupling can have an associated valve. A heater can be included, particularly in a male fitting or nozzle, associated with the material supply side.

Such an injection molding nozzle (with or without valves or heaters or other particulars) connects the barrel of an injection molding machine (the barrel being the heated material supply) with the mold so as to inject material through the nozzle and into the mold cavity. The nozzle defines the passage for the molten material (or melt) to flow into the mold from the barrel.

The nozzle can be mechanically engaged in a threaded or push-on coupling or the like, if necessary to resist detachment due to the pressure of injection. If the pressure is low, the nozzle can be urged against the corresponding mold cavity port to make the connection of flow paths from the nozzle to the mold cavity. Typically, the melt flow passage in the nozzle is an axial bore and connects to a cylindrical opening in the mold. The passageway in the mold, leading into the mold cavity, is tapered so as to form a larger opening at the mold cavity end and a smaller opening remote from the mold cavity. As a result, material that remains in the passageway after the material sets (known as the sprue) is shaped for ease of detachment and removal from the passageway together with the molded article. The sprue material is the last material to pass from the nozzle into the mold.

In connection with relatively high pressure and high temperature molding operations and in volume manufacturing, exemplified by the molding of polycarbonate data discs for use as audio CDs, CD-ROMs, DVDs and the like, the nozzle is typically made of a durable high temperature metal. The nozzle usually has a spherical shape at the tip and is held against the mold with considerable force. A heater maintains the flowpath through the nozzle at an elevated temperature comparable to the temperature of the material supply or barrel.

The material that remains in the passage leading from the nozzle connection into the mold cavity, namely the sprue, needs to cool together with the article that is formed by hardening of the melt in the mold cavity. The mold cannot be opened to remove the molded article until the article, and the sprue, are cool and stiff enough to be removed without deformation. Removing the article while the sprue is still soft can form an undesirable string of melt material. Sometimes, a still-soft sprue can deform from its own weight to the extent that removal is unreliable or the molded article can be ruined.

The nozzle and the sprue passage are thus problematic. The elevated temperature of the nozzle causes heat to flow from the material supply side toward the cooler mold in the area of the sprue passage. The molten material injected into the mold is naturally hotter near the point of its injection than at remote areas after such material flows into and through the cooler mold during filling. Other things being equal, the material most recently injected into the mold, which unfortunately is the sprue, also is likely to be the hottest material in the mold for a time after the completion of injection. These aspects aggravate the problems associated with the heat energy of the melt material at and adjacent to the sprue and sprue passage, delaying removal of the molded article from the mold and generally causing difficulties that increase molding cycle time or adversely affect the selection rate of production of good parts.

SUMMARY OF THE INVENTION

It is an object of the invention to reduce the capacity for heat energy to flow from molten material in an injection nozzle to a mold, especially at and adjacent to a sprue formed in a mold cavity, while otherwise providing a nozzle and mold that interact effectively.

A practical object of the invention is to provide a structure that cools an injection nozzle adjacent its tip, thereby reducing the temperature of the sprue so as to allow the sprue to harden sufficiently for safe removal from the mold earlier, and with reduced or eliminated stringing.

Another object is to reduce wasted energy due to heat flow from the injection nozzle to the mold.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The invention is exemplified according to preferred embodiments discussed herein. It is to be understood, however, that the invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In accordance with a preferred embodiment of the invention, a nozzle for injection molding is provided with a metallic nozzle having threads or similar means of attaching the nozzle to a material supply or injection barrel. A nozzle tip is structured for engagement with a mold, namely to place the mold cavity in communication with the material supply through the nozzle. For this purpose, an internal passage in the nozzle allows for flow of molten material.

According to an inventive aspect, a localized substantial restriction to conductive heat flow is interposed along the nozzle between the material supply and the tip of the nozzle that engages with the mold. This causes the extreme tip of the nozzle to thermally engage somewhat more intimately with the mold than would otherwise occur, namely if the nozzle had a typically continuous thermally conductive structure from the material supply to the engagement with the mold.

A result of this arrangement is that the mold tends to cool the extreme tip of the nozzle and the material therein, which comes to a temperature that is more nearly that of the mold, without unduly cooling the material in the nozzle located just to the proximal side of the tip (i.e., closer to the material supply).

In a preferred embodiment, the foregoing restriction to conductive heat flow is achieved by providing for an abrupt reduction in the wall thickness defining the cross section of flow along the nozzle. This reduction can be such that the reduced wall thickness of the cross section advantageously is supported by structural buttressing. According to a further embodiment, one or more air gaps, vacuum buffers, or insulating material sections can occupies the space where metal would be if the cross section was not reduced, or by gaps in the structure of the buttresses. Preferably, one or more air gaps disposed along the thermal conduction path function together with the foregoing material thickness reduction, obtaining the advantageous result that the temperature profile is shifted away from the mold and toward the material supply as compared to the prior art.

Figure 4:
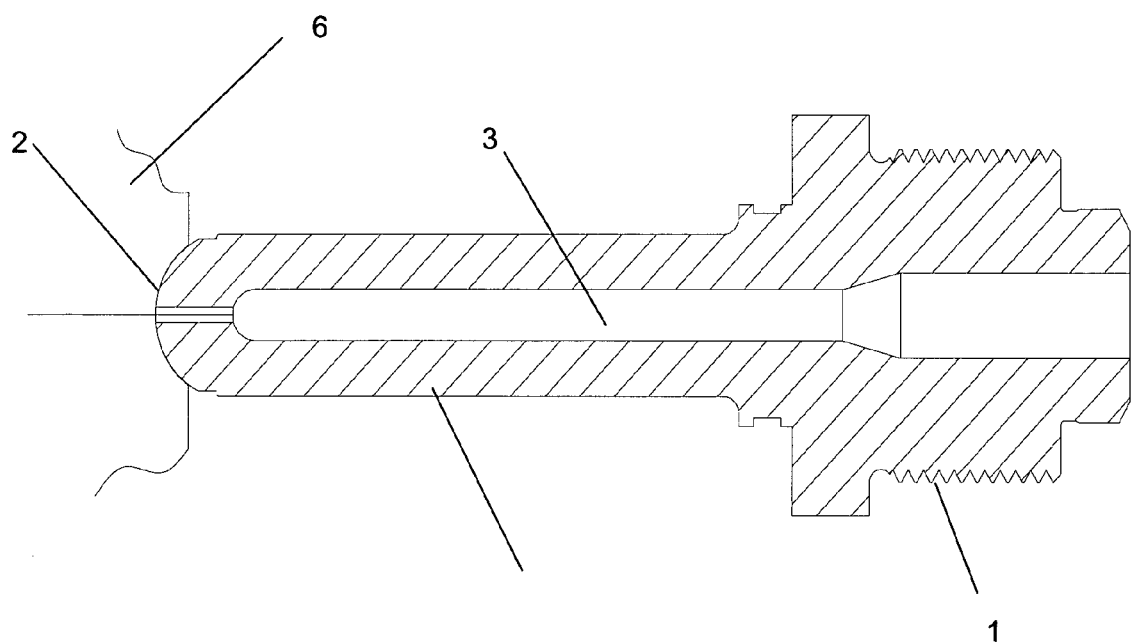
FIG. 4 is a comparison view showing a nozzle according to the prior art.

FIG. 4 shows a conventional a metallic injection molding nozzle, and is labeled as prior art. This sort of nozzle is used, for example, in injection molding of optical discs using heated polycarbonate injected into a mold cavity and cooled there to form the molded article. The nozzle is integrally formed of a highly thermally conductive metal, typically steel. The metallic nozzle has threads 1 that serve to attach the nozzle to a material supply (not shown) or injection barrel. A tip 2 at the end of an elongation 7 of the nozzle engages with a mold 6. An internal passage 3 in the nozzle carries the flow of molten material from the barrel to the tip, and communicates with an injection port (not shown) in the mold.

Figure 1:
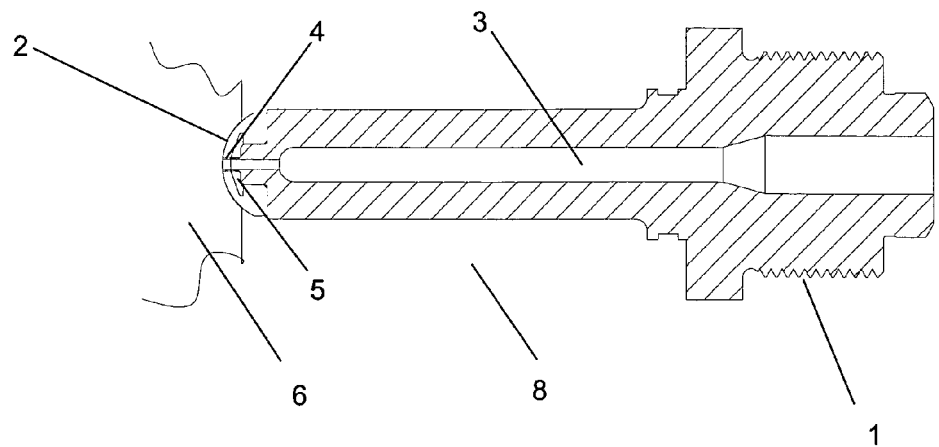
FIG. 1 is a partial sectional detail view showing the extreme end of an injection nozzle according to a preferred embodiment of the invention, bearing against a mold shown as a general outline.
Figure 2:
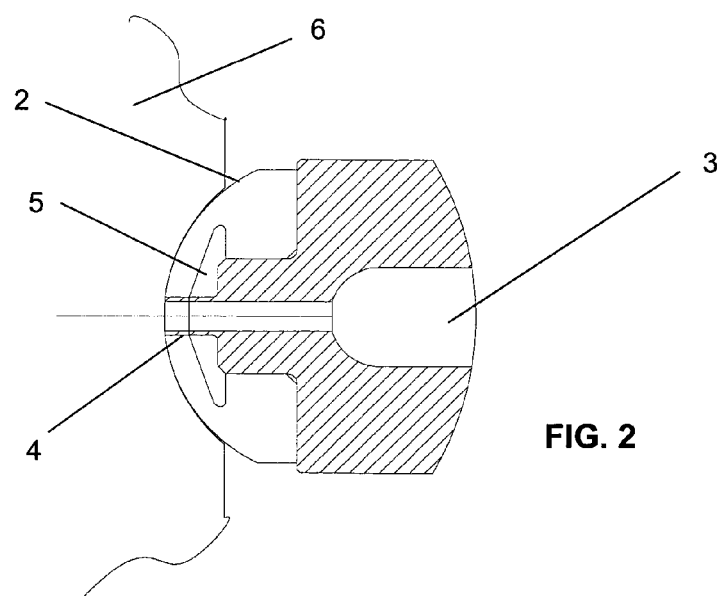
FIG. 2 is a cross sectional view through a complete nozzle according to the invention.
Figure 3:
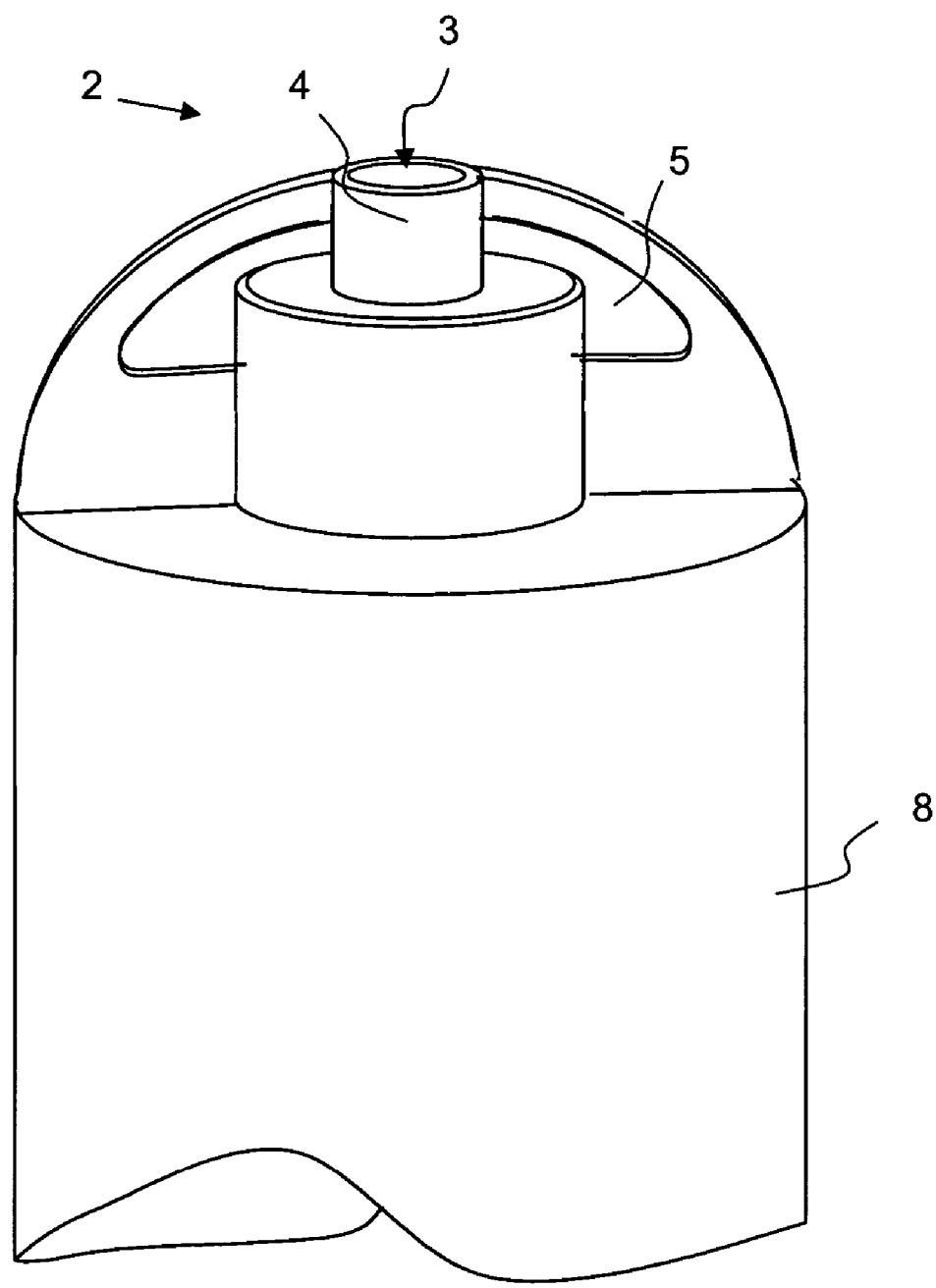
FIG. 3 is a perspective view showing a web support and buttress configuration of the invention.

According to the invention as shown sectionally in an exemplary embodiment in FIGS. 1 and 2, and in perspective in FIG. 3, an improved nozzle is arranged so that the same external structural elements enable the nozzle to engage with mold 6, but the coupling occurs across a substantial discontinuity in the thermal conduction capacity of the structure.

Therefore, the inventive nozzle, which also can be made of a durable and thermally conductive material such as steel, comprises a metallic nozzle body with threads 1 that can attach to an injection barrel, an end or tip 2 for engagement with a mold 6, an internal passage 3 along the nozzle for flow of molten material. A restriction to heat flow 4, however, is provided by an abrupt localized reduction in the wall thickness or similar conductive cross section of the metal portion of the nozzle. In the embodiment shown, an air gap 5 occupies a space where in the prior art arrangement of FIG. 4, thermally conductive metal would be disposed.

It can be noted by comparing FIGS. 2 and 4 that the internal contour of the two nozzle structures is the same. However in FIG. 2, a portion of the conductive material between the mold and the elongation 8 of the nozzle is omitted as compared to the solid elongation in FIG. 4 that extends clear to the tip 2.

The invention is characterized by two stepwise reductions in wall thickness proceeding to the extreme distal end of tip 2. The wall thickness is reduced near the typical internal diameter reduction, forming a cylindrical hub through which the flowpath passes, proceeding into at thin wall tube 4 that is formed at a further wall thickness reduction near the extreme end. At this point the material defining the flowpath (namely tube 4) has a wall thickness that may not be optimally strong. One or more buttressing fins can radiate from tube 4 to support the tube 4. These buttresses have an axial facing end surface that fits within the contour of a hemispherically rounded end, namely a contour resembling that of the conventional nozzle shown in FIG. 4, but has the structure has substantially less thermally conductive material. The thermally conductive material that is provided is thin and thus has a smaller capacity to convey heat energy by thermal conduction than a thick walled structure as in FIG. 4. Furthermore, the path of thermal conduction through the buttressing fins is discontinuous due to gaps 5.

Thermal analysis using finite element software techniques performed to size and locate the reduced cross section of the nozzle to substantially lessen heat flow to the tip of the nozzle. The analysis demonstrates that allowing contact with the mold tends to cool the nozzle tip along the endmost zone where the internal diameter of the material flow path is reduced. The structure is cooled most markedly at tube 4. This cooling of the material at the end of the nozzle is accomplished while limiting cooing of the material along the shank or extension 8 of the nozzle.

As thereby structured, the invention provides a nozzle for injection molding, having a thermally conductive nozzle body 8, defining an internal passage 3 for conveying a flow of heated melt through the nozzle body. A nozzle tip 2 on an end of the nozzle body communicates with the internal passage 3. The nozzle tip is structured for engagement with a mold 6 for coupling the passage to an injection inlet. According to an inventive aspect, a heat flow blocking configuration 4, 5 is disposed between an extreme end of the nozzle tip 2 and a point 8 along of the internal passage 3 spaced back from the nozzle tip 2.

The heat flow blocking configuration preferably comprises a portion 4, 5 having reduced thermal conduction capacity between the extreme end and the point spaced backed from the nozzle tip. The portion having reduced thermal conduction can involve a reduction in wall thickness along the internal passage 3. Actually the conventional arrangement in FIG. 4 involves a reduction in flow path cross section that provides an increase in wall thickness at the nozzle end. According to the invention shown in FIGS. 1 and 2, a reduction in wall thickness occurs at an extension of the internal passage at the extreme end of the nozzle tip, namely at tube 4.

In a preferred arrangement, the extreme end of the nozzle, namely at tube 4 where the wall thickness is at its minimum, at least one fin extends laterally from the extension of the internal passage to the nozzle body, for supporting said extension or tube 4. The thermal conduction blockage that this structure provides can be enhanced, by providing a material gap 5 in the fin, as well as the material gap that is inherent in providing a thin tube 4 instead of the continuously thick or even increased nozzle wall thickness as in the conventional nozzle.

The internal passage 3 that carries the melt extends axially along the nozzle body. As in the conventional nozzle, the invention has a reduction in internal diameter near the end 2. Unlike the conventional arrangement, the invention provides an axially placed cylindrical hub at the end of the nozzle, through which the passage 3 extends. This hub has a diameter less than a diameter of the nozzle body. The passage 3 continues into the tubular extension 4 from the cylindrical hub. The tubular extension 4 has a wall thickness less than a wall thickness of the cylindrical hub.

As shown in FIGS. 1–3, at least one fin forms a buttress supporting the tubular extension 4 relative to the cylindrical hub. The fin can form at least two radially extending buttresses that produce the hemispherical shape at their axially facing edges directed toward the mold 6. These fins or buttresses can be diametrically opposite or angularly spaced, etc. In the preferred embodiment the buttressing fins are define a gap 5 between the cylindrical hub and one or more arching buttress-forming webs along the hemispherical contour.

In general, the invention is a nozzle for coupling to an injection mold having an injection inlet, comprising a thermally conductive nozzle body defining an internal passage for conveying a flow of heated melt through the nozzle body. A nozzle body and nozzle tip on an end of the nozzle body communicating with the internal passage. The nozzle tip is structured for engagement with a mold for coupling the passage to an injection inlet. A thermally discontinuously conductive structure disposed between an extreme end of the nozzle tip and a point of the internal passage spaced back from the nozzle tip. This nozzle substantially comprises a thermally conductive metal material and the thermally discontinuously conductive structure comprises a gap in the thermally conductive metal material between the nozzle body and the nozzle tip. The gap can include one or more of a gap provided by a reduction in material thickness along a thermal conduction pathway, and a gap interrupting the thermal conduction pathway, such as the opening 5 along the supporting web as described.

Figure 5:
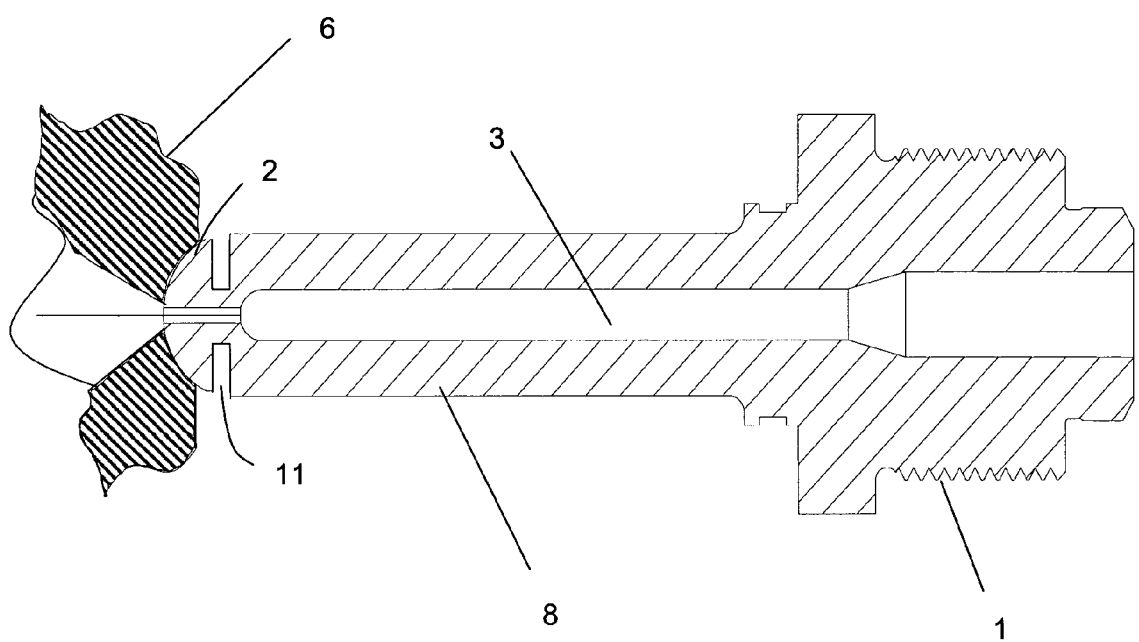
FIG. 5 is a section view illustrating an alternative embodiment of the invention.

FIG. 5 illustrates a practical embodiment wherein the heat flow blocking configuration comprises an interruption in the form of a radial groove 11 that separates a metallic thermally conductive hemispherical tip 2 from the shank or elongation 8 of the nozzle body. The metallic hemispherical tip 2 mates with the mold 6 as shown. The tip 2 can be an attachable element, for example threaded onto a complementary thread in the nozzle body. Alternatively, tip 2 can be integral with the elongation part 8 of the nozzle and delineated by groove 11.

A fully hemispherical tip as in the embodiment of FIG. 5 better ensures that hot melt does not leak out between the nozzle tip 2 and the mold 6, as compared to FIGS. 1–3. The hemispherical shape is relatively solid and durable. The limited wall thickness of the passageway at the bottom of the groove provides structural support.

In the embodiment of FIG. 5, an insulating volume is provided in radial groove 11, extending axially by the width of the groove 11 In the embodiment shown, the groove 11 is occupied by air, which is a thermal insulation insofar as conduction is concerned. The groove 11 can be occupied by an appropriately high temperature insulator such as a split ceramic washer, or by a high temperature insulated packing, to further insulate against thermal coupling across the groove.

In any event, a distinct break against conveyance of thermal energy, at least due to conduction, is provided between the tip 2 and the elongation 8. As a result, the tip 2 can assume a temperature that is close to the temperature of the mold 6 when in engagement with the mold, cooling the endmost part of the passageway 4.

The invention has been described in connection with certain preferred embodiments, but these examples are not intended to limit the scope of the invention to the particular form set forth, but on the contrary, it is intended to cover such alternatives, modifications, and equivalents as may be included within the spirit and scope of the invention as defined by the appended claims.

What is claimed is:

1. A nozzle for injection molding, comprising:
   a thermally conductive nozzle body defining an internal passage for conveying a flow of heated melt through the nozzle body, wherein the internal passage extends axially along the nozzle body to an axially placed cylindrical hub of a diameter less than a diameter of the nozzle body;
   a tubular extension from the cylindrical hub, the tubular extension having a wall thickness less than a wall thickness of the cylindrical hub;
   a nozzle tip on an end of the nozzle body, communicating with the internal passage, wherein the nozzle tip is structured for engagement with a mold for coupling the passage to an injection inlet; and,
   wherein a heat flow blocking configuration is disposed between an extreme end of the nozzle tip and a point of the internal passage spaced back from the nozzle tip.

2. The nozzle of claim 1, wherein the heat flow blocking configuration comprises a portion having reduced thermal conduction capacity between the extreme end and the point spaced backed from the nozzle tip.

3. The nozzle of claim 2, wherein the portion having reduced thermal conduction comprises a reduction in wall thickness along the internal passage.

4. The nozzle of claim 3, wherein the reduction in wall thickness occurs at an extension of the internal passage at the extreme end of the nozzle tip.

5. The nozzle of claim 4, further comprising at least one fin extending laterally from the extension of the internal passage to the nozzle body, for supporting said extension.

6. The nozzle of claim 5, wherein the fin supporting the extension has a material gap between the extension and the nozzle body.

7. The nozzle of claim 1, further comprising at least one fin forming a buttress supporting the tubular extension relative to the cylindrical hub.

8. The nozzle of claim 7, wherein the fin forms at least two radially extending buttresses.

9. The nozzle of claim 8, wherein the buttresses are diametrically opposite.

10. The nozzle of claim 7, wherein the fin has a gap between the cylindrical hub and a buttress forming web.

11. The nozzle of claim 7, wherein the web extends along a line of a spherical surface.

12. A nozzle for injection molding, comprising:
    a thermally conductive nozzle body defining an internal passage for conveying a flow of heated melt through the nozzle body;
    a nozzle tip on an end of the nozzle body, communicating with the internal passage, wherein the nozzle tip is structured for engagement with a mold for coupling the passage to an injection inlet;
    a heat flow blocking configuration disposed between an extreme end of the nozzle tip and a point of the internal passage spaced back from the nozzle tip, the heat flow blocking configuration comprising a portion having reduced thermal conduction capacity between the extreme end and the point spaced back from the nozzle tip, said portion including a reduced wall thickness along the internal passage, and a material gap extending radially over an axial span between the extreme end and the point of the internal passage spaced back from the nozzle tip.

13. The nozzle of claim 12, wherein the material gap is formed by an opening in a fin comprising radially extending buttresses.

14. The nozzle of claim 12, wherein the material gap comprises a radial groove extending for said axial span.

* * * * *